Oct. 30, 1956     A. S. PARKS     2,768,703
METHODS OF AND MEANS FOR SEPARATING HYDROCARBON
LIQUIDS AND WATER FROM GAS STREAMS
Filed March 16, 1953     3 Sheets-Sheet 2

Fig. 2

Asbury S. Parks
INVENTOR.

BY Vincent Martin
Jos. E. Edwards
B. R. Pravel
ATTORNEYS

United States Patent Office 2,768,703
Patented Oct. 30, 1956

2,768,703

METHODS OF AND MEANS FOR SEPARATING HYDROCARBON LIQUIDS AND WATER FROM GAS STREAMS

Asbury S. Parks, Houston, Tex.

Application March 16, 1953, Serial No. 342,539

16 Claims. (Cl. 183—2)

This invention relates to new and useful improvements in methods of and means for separating hydrocarbon liquids and water from gas streams.

The invention relates particularly to apparatus for use in separating hydrocarbon components and water from a flowing gas stream.

It is well known that a gas stream under a given pressure and temperature has a certain liquid carrying capacity and said stream has liquids, which may be hydrocarbon components and water, in the vapor phase therein. It is also well known that by cooling of the gas stream, that is, lowering the temperature thereof, a condensation of the liquid components may be effected, whereby said components may be recovered. The cooling of a gas stream which contains some water is generally limited by the hydrate formation point, that is, by the point at which the water which has been condensed will freeze and form ice particles or "hydrates" which interfere with subsequent operation.

In the past the cooling of the gas has been accomplished by reducing the pressure of the gas through a restriction or choke and operation below the hydrate formation point has been made possible by certain prior art apparatus, such as that disclosed in the patent to Barry, No. 2,528,028. Although apparatus such as that shown in the Barry patent has been found satisfactory for increasing hydrocarbon recovery and dehydrating the gas, this type of apparatus depends upon the cooling being accomplished by expansion through a restriction in accordance with the Joule-Thompson effect, and this places a definite limitation on the apparatus. As is well known, the cooling accomplished by the Joule-Thompson effect is a function of the composition of the gas stream and the interval of pressure reduction. The interval of pressure reduction is the primary factor in determining the degree of cooling and, therefore, the cooling is dependent upon the difference in the initial pressure in advance of the choke and the final pressure downstream of the choke. Thus, in order to effect temperature reduction or cooling which is necessary for condensation of the liquid components, the pressure of the gas stream must be materially reduced, and unless the initial pressure of the gas stream is of a high order the degree of cooling which can be obtained is definitely limited.

It is therefore apparent that apparatus which is dependent upon the cooling being effected by expansion through a restriction is not adaptable for use with gas streams under the lower pressures. For example, if a gas stream having an initial pressure of 1,000 pounds p. s. i. and a temperature of 100° F. is expanded by simple throttling expansion to 500 pounds, the temperature reduction will only be in the order of approximately 25° F., so that the final temperature of the gas would be 75° F.; such temperature will result in relatively little condensation of the liquid components of the gas stream, and thus the present methods now in use are efficient to increase hydrocarbon or liquid recovery only when the initial pressure of the gas stream is high enough to permit a sufficiently great pressure drop to effect the necessary temperature reduction or cooling effect which produces the condensation of liquid components.

It is well known that when a gas is expanded in such a way that it performs mechanical work, the energy content of the gas is reduced. This reduction in energy content results in cooling of the gas, unless outside heat is supplied. Such an ideal process is generally referred to as adiabatic. When expanded in this manner a cooling occurs but the degree of cooling is not dependent upon the difference between initial and final pressure, as is the case where the Joule-Thompson effect controls, but rather is primarily dependent upon the ratio of the initial pressure to the final pressure. Inasmuch as cooling by expansion of gas where work is performed by the gas is substantially independent of the interval of pressure reduction, increased cooling can be accomplished throughout all pressure ranges which makes the method applicable to separation processes where initial stream pressures are of an order below that at which the Joule-Thompson systems are efficient from a practical standpoint.

It is a main object of this invention to provide an improved method and means for efficiently separating liquids and liquid components from a gas stream, which method involves cooling by pressure reduction but which does not depend upon the interval of pressure reduction for cooling effect, whereby said method is effective throughout substantially all pressure ranges and is universally applicable to gas streams under pressure.

Another object of the invention is to provide an improved method for effecting the removal of liquefiable fractions from a gaseous stream under pressure wherein the liquefiable fractions are originally in a vapor phase under the initial pressure and temperature of said stream, said method involving the step of restricting liquid movement from a chamber wherein gas expansion is occurring, said restricting of fluid flow functioning to absorb the energy liberated by the expanding gas to thereby cool the gas and heat the liquid.

An important object is to provide an improved method wherein a gas stream is directed to a closed chamber having liquid therein and is confined in a space within said chamber above the liquid, after which the gas is permitted to expand to displace said liquid, said expansion resulting in a cooling of the gas which condenses liquid components within the gas and at the same time resulting in a heating of the liquid being displaced, whereby formation of hydrates which might interfere with subsequent operation is effectively prevented.

Another object is to provide an improved method wherein the gas stream from which the liquids are to be separated is caused to expand and to perform work upon a liquid body, which work results in a transfer of energy from the gas to the liquid to thereby cool the gas and condense its liquid components and at the same time to heat the liquid to prevent formation of hydrates which might otherwise interfere with the operation; the expansion ratio of the gas being controlled to produce the desired or predetermined cooling effect necessary for the condensation of the liquid components contained within the gas stream.

Another object is to provide an improved apparatus for effectively separating liquids from a gas stream which includes a vessel having liquid in the lower portion thereof, together with means for introducing the gas stream into the space above the liquid level and thereafter causing the gas to expand and displace said liquid, whereby the expansion produces a transfer of energy from the gas to the liquid, which results in cooling the gas and heating the liquid.

Still another object is to provide an apparatus which utilizes the expansion of the gas stream to effect cooling of the gas and heating of the liquid, said apparatus including a pair of interconnected vessels or chambers having liquid in the lower portion thereof and having means for alternately directing the gas stream to the vessels or chambers, whereby a substantially continuous operation may be carried out to effect increased hydrocarbon recovery and dehydration of the gas.

A particular object of the invention is to provide an apparatus, of the character described, wherein the rate of displaced liquid movement between the vessels is controlled to regulate the rate of gas flow through the apparatus and thereby control the capacity of the apparatus.

Another object is to provide an improved apparatus of the character described for increasing hydrocarbon recovery and for dehydrating a gas stream wherein the liquid, which is displaced by the expansion of the gas, is controlled in its level within the respective chambers of the apparatus by liquid level controllers, together with means for utilizing the liquid level controllers to actuate and control the operation of the gas inlet and outlet valves, whereby completely automatic operation is effected.

A particular object is to provide an apparatus of the character described having means for controlling the maximum and minimum levels of the liquid within the vessel, whereby the expansion ratio of the gas introduced into the space above the liquid in the chamber will be accurately controlled to thereby produce the desired cooling effect required for most efficient condensation of the liquid components which are initially present in said gas.

Other objects will appear hereinafter.

The construction designed to carry out the invention will be hereinafter described together with other features thereof.

The invention will be more readily understood from a reading of the following specification and by reference to the accompanying drawings forming a part thereof, wherein an example of the invention is shown, and wherein.

In the drawings the letter A designates a vessel or tank which may be of any suitable construction, while the letter B designates a similar vessel or tank. A conductor or pipe 10 connects the lower ends of the vessels A and B with each other, whereby liquid may be displaced from one vessel to the other through said conductor 10. For controlling the rate of flow through the conductor 10, an adjustable choke or valve 11 is mounted therein and adjustment of said choke or valve will obviously control the rate of flow through the conductor to thereby control the rate of displacement of liquid from one vessel to the other. If it is desired to cool or heat the liquid flowing through the conductor 10 a suitable heat exchanger 12 may be mounted within the conductor but the use of this heat exchanger is optional.

A liquid level control assembly L is mounted in the lower end of the vessel A and, as will be explained, controls the minimum level to which the liquid within said vessel may fall. A similar liquid level control assembly L' is mounted in the lower portion of the second vessel B and controls the minimum level of liquid within said vessel B. The maximum level to which the liquid in the interconnected vessels A and B may rise is controlled by spillover pipes 13, 14 and 15. These spillover pipes extend in a horizontal plane and have valves 13a, 14a and 15a connected therein, which valves may be opened and closed to permit or shut off flow through their respective pipes. One end of each spillover pipe is connected with a common conductor 16 which communicates with the interior of the vessel A. The opposite end of each spillover pipe is connected with a common conductor 17, the lower end of which communicates with the interior of a liquid dump pot 18 and the upper end of which is in communication at 19 with the interior of the upper end of the vessel A. The conductor 17 thus functions to conduct fluid from the spillover pipes 13, 14 or 15 to the dump pot 18 and also acts as an equalizer line between the dump pot and the vessel A.

It will be evident that with valves 13a and 14a closed, with valve 15a open, the maximum level to which the liquid can rise within the vessel A will be in the plane of the spillover pipe 15. Because the interior of the vessel A communicates with the spillover pipe through the conductor 16 any rise of liquid within the vessel A beyond the level of the pipe 15 will cause liquid to spill over into conductor 17 and into the dump pot 18. A suitable liquid level control assembly L2 is mounted in the dump pot and controls the operations of a discharge valve 20, which is connected in the discharge line 21 extending from the dump pot. Thus, when liquid is accumulated in the dump pot above a certain level the controller L2 operates to open valve 20 and discharge some of the liquid through line 21. If it is desired to change the maximum level to which the liquid can rise within vessel A valve 15a is closed and valve 14a in spillover line 14 is opened; in such case, the maximum level to which the liquid may rise within vessel A will be determined by the plane in which the spillover pipe 14 is located.

Figure 1:
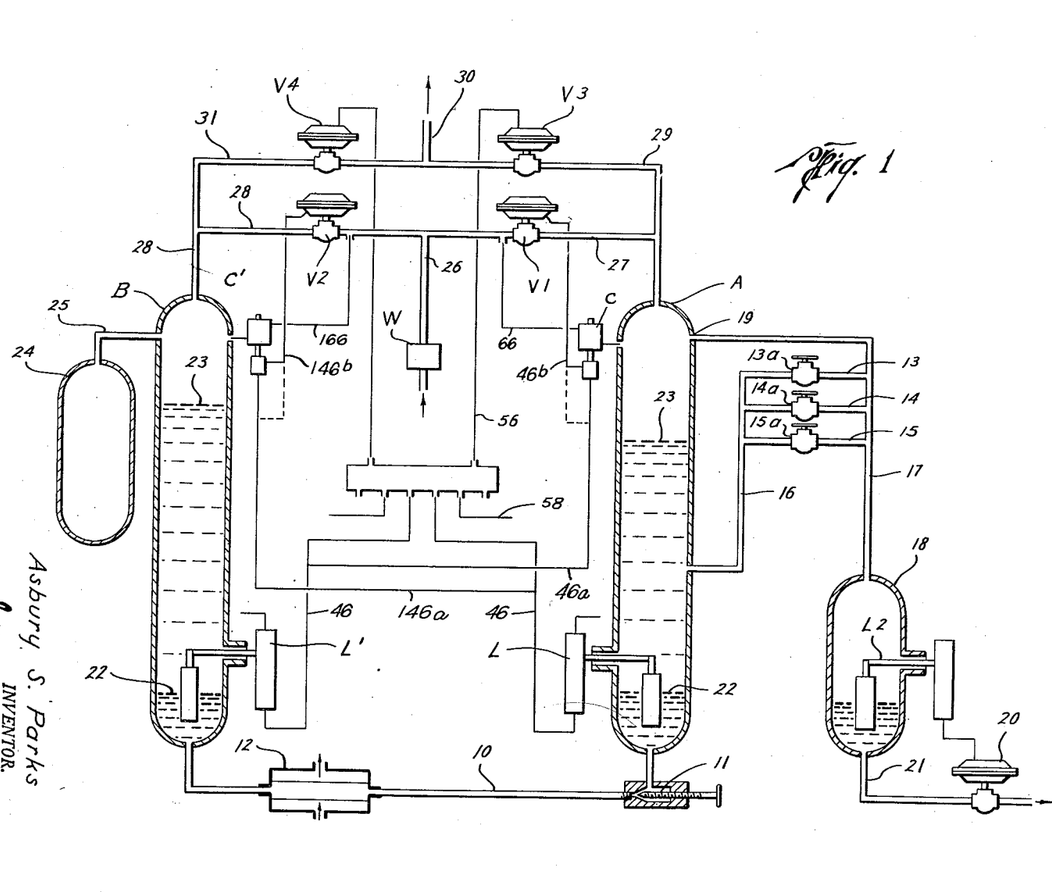
Figure 1 is a diagrammatic view illustrating the apparatus constructed in accordance with the invention for carrying out the improved method.

As will appear hereinafter, the liquid in vessel A is adapted to be displaced through the connecting conductor 10 and into the vessel B whereby the liquid level in vessel A will be lowered while the liquid level in vessel B will be raised. The liquid level controller L in the lower portion of vessel A functions to control the minimum level of the liquid within vessel A and when said liquid drops to such level the controller L will operate to prevent further displacement of liquid from vessel A. Upon the succeeding operation the liquid within the vessel B is again displaced back into vessel A, and the minimum level of the liquid in vessel B is controlled by the controller L' so that displacement back into vessel A is stopped when the level in chamber B drops to a predetermined point. As indicated in Figure 1 the minimum level in each of the vessels A and B as controlled by the controllers L and L' may be at the level 22. The maximum level to which the liquid may rise in the vessel A is indicated at 23, this level being determined by assuming that the valve 15a in spillover pipe 15 is opened, while valves 13a and 14a in spillover pipes 13 and 14 are closed.

Because the vessels A and B are interconnected it is not necessary to provide a separate maximum level control for the vessel B, because this maximum level will be substantially controlled by the spillover pipes connected to vessel A; however, if desired, a maximum level control consisting of spillover pipes and dump pot arrangement may be provided for vessel B, although as pointed out it has been found unnecessary since sufficiently accurate control of maximum level may be effected by the use of the spillover pipes connected with vessel A.

As will be explained, the gas stream from which hydrocarbon components are to be recovered and liquids are to be removed will be directed into the upper end of each vessel A and B during the operation of the apparatus, and in order that the upper portion of the vessels may have the same volumetric area an equalizer chamber 24 is connected through line 25 with the upper end of vessel B. The volumetric space of the equalizer chamber is substantially equal to the volumetric space of conductor 17 and the area of the liquid dump pot above the liquid level so that substantially the same volume of gas may be introduced into both vessels upon each operation thereof.

If a spillover and dump pot assembly is provided for the vessel B, then the equalizer chamber would be omitted.

The gas stream under pressure is adapted to be introduced alternately into the vessels A and B through a main inlet line 26. This main inlet line has connection with an inlet pipe 27 which extends to the upper end of the vessel A and admission of the gas to vessel A is controlled by a diaphragm-operated or motor valve V1. The main inlet line is also connected to an inlet pipe 28 which communicates with the upper end of the vessel B and a motor valve V2 mounted in line 28 controls flow therethrough. A branch conductor 29 has connection with the inlet pipe 27 and its opposite end is in communication with a main discharge or outlet line 30. A motor valve V3 is mounted in the branch conductor 29 to control flow therethrough. Also connected with the main discharge or outlet line is a branch conductor 31 which is in communication with the inlet pipe 28 which leads to the upper end of the vessel B and a suitable motor valve V4 is mounted in said conductor 31 to control the flow therethrough.

As will be explained, the operation of the valves V1 to V4 is automatically controlled by the liquid in the vessels A and B and when the valve V1 is open to admit gas to the upper end of vessel A, valve V2 is closed so that gas cannot flow from the main inlet 26 to vessel B; at the same time, the outlet valve V3 for vessel A is closed while the outlet valve V4 for the vessel B is open. With the valves in such position (Fig. 1) gas is introduced into the area above the liquid in vessel A and after a predetermined volume or charge of gas has been introduced, valve V1 is adapted to close. The gas in the upper portion of vessel A then expands to displace liquid from the vessel A through the conductor 10 into the vessel B at a rate which is controlled by adjustment of the choke or regulating valve 11. The expansion of the gas displaces the liquid and due to the performance of this work upon the liquid, a transfer of energy from the gas to the liquid is effected, whereby the gas is cooled and the liquid is heated. When the liquid level in vessel A is lowered to the level 22 in Figure 1 the controller L functions to close the discharge valve V4 leading from vessel B, so that further displacement of liquid is halted; at the same time, the level controller L opens the gas inlet valve V2 for the vessel B and also opens the discharge valve V3 for vessel A.

The operation of the valves V2, V3 and V4 by the level controller L permits an introduction of gas into the vessel B within the space above the liquid level therein, such level having risen to approximately the point 23 in vessel B. After a predetermined charge or volume of gas has been introduced into vessel B the inlet valve V2 is closed and thereafter the expansion of the gas within the vessel B displaces the liquid from the vessel B back into the vessel A through the conductor 10 to repeat the energy transfer which results in cooling of the gas and heating of the liquid. Escape of gas from the upper end of vessel A is through the branch conductor 29, outlet valve V3 and into the main discharge line 30. Displacement of liquid from the vessel B continues until the level of the liquid drops to the point 22, at which time the level controller L' functions to operate valve V3 to close said valve and thereby halt further displacement. Simultaneously with closing of the outlet valve V3, the level controller L' opens the inlet valve V1 for vessel A and also opens the discharge valve V4 for vessel B. Thereafter, gas from the main inlet 26 is again directed to the upper portion of the vessel A and the cycle of operation is repeated.

The apparatus is preferably arranged so that a predetermined volume or charge of gas under the pressure of the gas stream is introduced into each vessel, and when such predetermined charge or volume has been introduced the gas inlet valve for that vessel closes. The inlet valves are full opening so that substantially the full gas stream pressure is introduced into the area above the liquid level within the vessel substantially instantaneously. Because the liquid can escape from the vessel only at a limited rate due to the choke or regulating valve 11 there is little displacement of the liquid by the initial introduction of the charge or volume of gas. However, the subsequent expansion of the gas acting upon the liquid accomplishes the displacement of the liquid from one vessel to the other.

Figures 3, 4, 5:
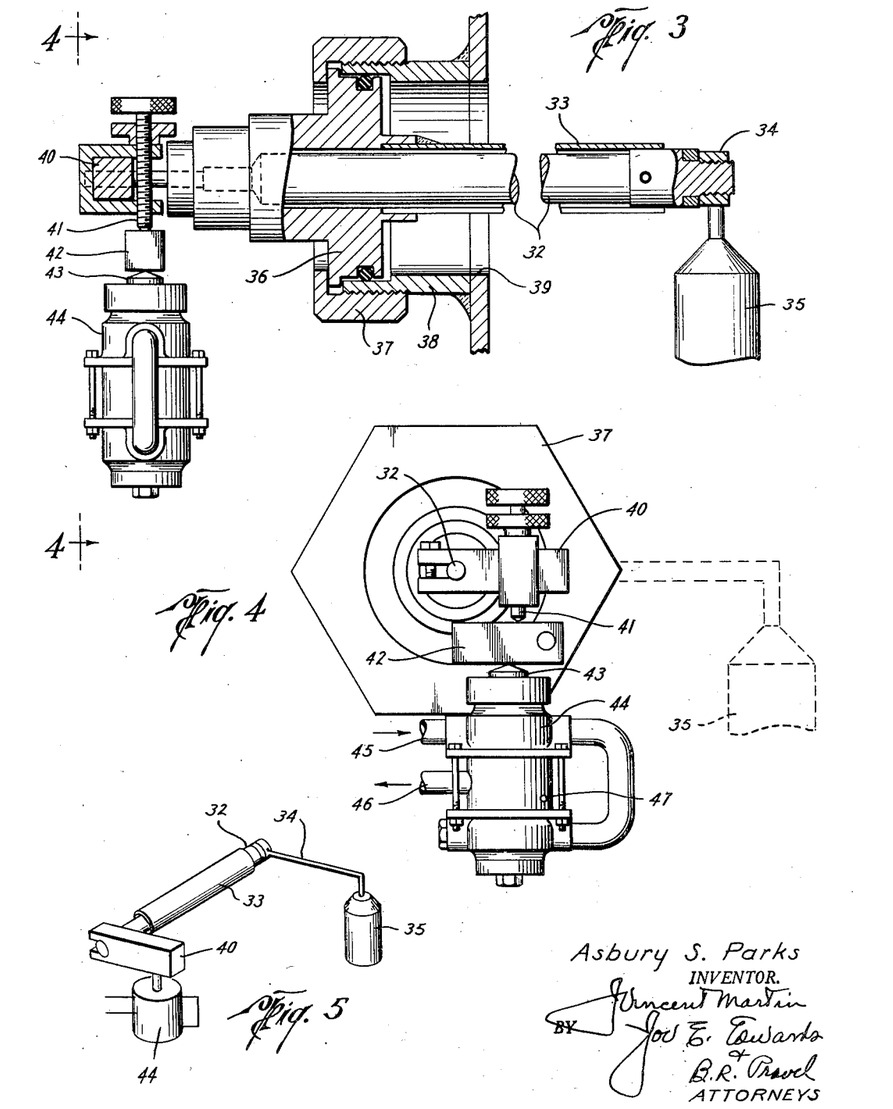
Figure 3 is a sectional detail of one of the liquid level controllers.
Figure 4 is an end elevation of the part shown in Figure 3.
Figure 5 is an isometric view of the liquid level controller.

The liquid level controllers L and L' may be of any suitable construction and function to control the application of a pilot pressure to the diaphragms of the valves V1 to V4 to effect the operation of said valves. The particular liquid level controller which has been found satisfactory is illustrated in Figures 3–5 and is constructed in accordance with the disclosure in my copending application, Serial No. 105,203, filed July 16, 1949, now Patent No. 2,649,771, issued August 25, 1953. Each liquid level controller includes an operating shaft 32 which extends inwardly through a torque tube 33 into the interior of the vessel. A float support arm 34 is mounted on the inner end of the shaft and has a solid type float 35 suspended from its end (Figure 5). The torque arm is supported by a suitable plug or closure member 36 which is retained by a retaining collar 37 within the outer end of a nipple 38, said nipple being welded to the wall of the vessel and extending outwardly from an opening 39 which communicates with the interior of the vessel.

The outer end of the operating shaft 32 is reduced and has an actuating arm 40 secured thereto. A force applying pin member 41 is adjustably mounted on the arm 40 and functions to apply a downward force to a pivoted bar 42, which bar rests upon the actuating element 43 of a pilot control device 44. The device 44 may take various forms but is preferably of the construction shown in my co-pending application above referred to and functions to control the admission of pilot pressure from a pilot pressure line 45 to a pilot pressure conductor 46.

When the level of the liquid within the vessel in which the level controller is mounted falls to a predetermined point, the buoyancy of the float 35 is lessened and the solid float tends to impart a rotation to the operating shaft 32; this results in a downward swinging of the arm 40 on the outer end of the shaft, which results in the application of force to the actuating element 43 of the pilot pressure control unit 44, and when this force reaches a predetermined point in accordance with the adjustment of the device 44, the full pilot pressure from the pilot pressure source or line 45 is admitted to the conductor 46. When the liquid level in the vessel rises the application of force upon the element 43 is decreased, and when such decreased force is to a predetermined point the device 44 operates to vent the pressure from conductor 46 through a vent 47 in the control device 44. Thus, the controller operates to either apply full pilot pressure to the conductor 46 or to vent such conductor to atmosphere.

Figure 2:
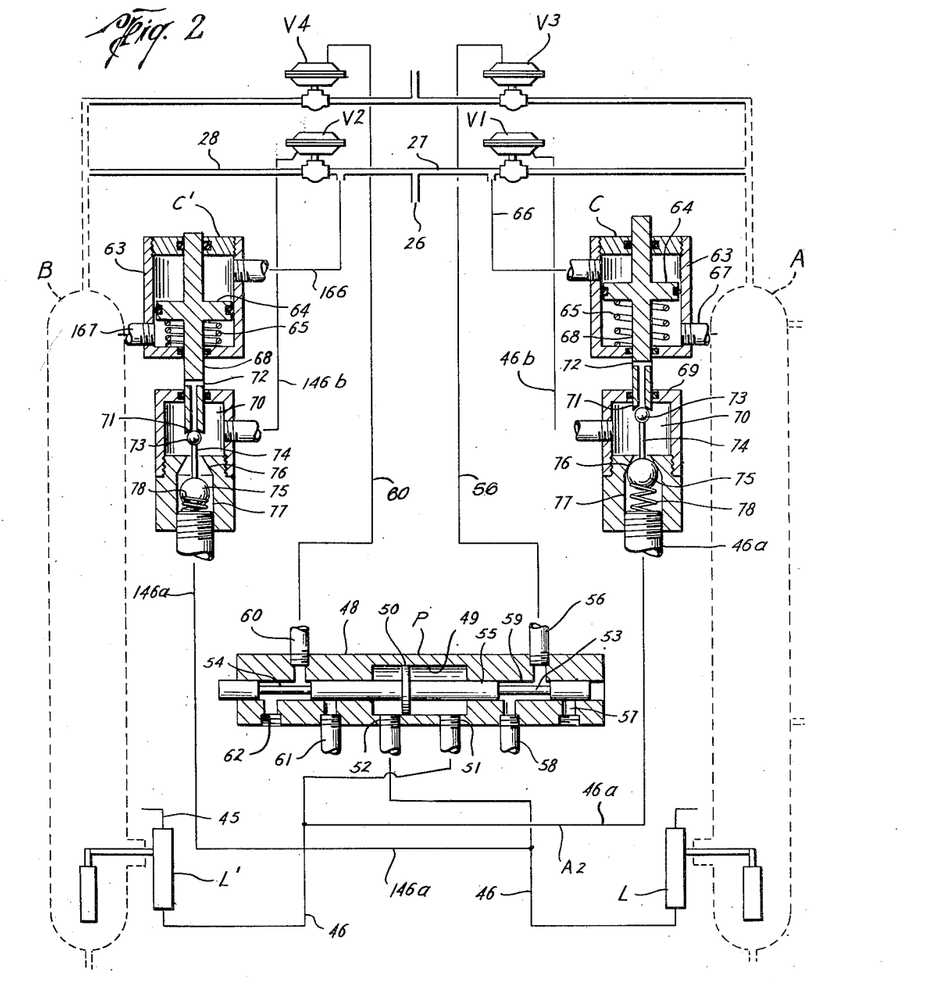
Figure 2 is a view illustrating the detailed construction of the various control devices and showing their relationship to the vessels and associate parts.

The conductors 46 which extend from the liquid level controllers L and L' are connected to a control piston and valve assembly P, which assembly is illustrated in Figure 2 and comprises a main housing 48 having a central cylinder 49 within which a piston 50 is movable. The conductor 46 from the level controller L connects into an opening 52 at one end of the cylinder 49 while the conductor 46 from the level controller L' connects into an opening 51 at the opposite end of the piston. It will be evident that when full pilot pressure is applied through conductor 46 of level controller L the piston 50 will be moved in a direction toward the right in Figure 2, provided, of course, that the conductor 46 from controller L' is vented; similarly, with the conductor 46 of controller L vented the application of full pilot pressure through conductor 46 of controller L' will result in a movement of the piston 50 in a direction to the left in Figure 2.

The piston 50 and its position within the cylinder 49 controls the position of piston valves 53 and 54 which are connected to the piston by a piston rod 55. The valve 53 is adapted to control the application of pressure through a line 56 to the outlet valve V3 for the vessel A. This control is accomplished by the valve establishing communication between line 56 and a vent port 57 or by establishing communication between line 56 and a pilot pressure conductor 58. The conductor 58 may, of course, be connected with the same source of pilot pressure which supplies the pilot control device 44 of each level controller. When the valve 53 is in the position shown in Figure 2, full pilot pressure is applied through conductor 58, then through a passage 59 formed within the casing 48 of the assembly and through line 56 which extends to the diaphragm case of valve V3. Upon a shifting of valve 53 in a direction to the right from that shown in Figure 2, the line 56 extending from valve V3 is placed in communication with the vent opening 57 and pressure against the diaphragm of valve V3 is relieved.

The valve 54 at the opposite end of the assembly P is adapted to control the application of pressure through a line 60 which extends to the diaphragm case of the outlet valve V4 for the vessel B. This valve functions in the same manner as the valve 53 and establishes communication between the line 60 and a pilot pressure conductor 61 or establishes communication between the line 60 and a vent opening 62. With the valve in the position shown in Figure 2, the line 60 is vented to atmosphere and valve V4 is open. It is noted that the valves 53 and 54 are so arranged that when pressure is being applied to the outlet valve V3 to close said valve no pressure is applied to the valve V4 whereby the latter valve is opened. When the position of the piston 50 is shifted to the right in Figure 2, valve 53 vents the line 56 to valve V3 to open said valve and at the same time valve 54 actuates to apply pressure to valve V4 to close said valve. It is thus obvious that the piston and valve assembly P controls the opening and closing of the outlet valves V3 and V4 and is so arranged that one outlet valve is open while the other outlet valve is closed.

The inlet valve V1, which is the inlet valve controlling the inlet of the gas stream into the vessel A, is also controlled by the pilot pressure in the conductor 46 which extends from the level controller L' in the vessel B. When the liquid level in vessel B falls to the level 22, full pilot pressure is applied to conductor 46 and causes a shifting of the piston 50 in a direction to the right in Figure 2. Shifting of the piston 50 accomplishes movement of valve 53 to a position which will direct pressure to the outlet valve V3 of vessel, whereby valve V3 is closed; the shifting of the piston 50 also moves valve 54 to a position which relieves the pressure acting on valve V4 of the vessel B to open this valve V4. At the same time a branch conductor 46a which extends from the conductor 46 conducts pressure through a control unit C which enters into the operation of the valve V1. The construction of the control unit is clearly illustrated in Figure 2 and includes a main cylinder 63 having a piston 64 movable therein. A coil spring 65 normally urges the piston toward a raised position. The upper end of the cylinder has connection through a line 66 with the inlet pipe 27 at a point in advance or upstream of valve V1, whereby the full gas stream pressure from the main inlet line 26 is always applied to the upper end of piston 64. The under side of piston 64 is exposed through a connection 67 to the pressure which is present within the upper end of the vessel A, and when pressures are equalized across the piston 64, the spring 65 moves said piston to an upper position within the cylinder 63.

The piston 64 has a downwardly extending piston rod 68 which projects from the lower end of the cylinder 63 and into the upper end of a casing 69 within which a chamber 70 is formed. A valve seat 71 is formed on the lower end of the piston rod 68 and extending from this valve seat is a vent passage 72. The vent passage discharges to atmosphere at a point between the cylinder 63 and the casing 69.

The valve seat 71 which is formed at the lower end of the piston rod 68 engages a ball valve 73 which has connection through a rod 74 with a second or larger ball valve 75. The latter is adapted to engage a seat 76 formed at the upper end of a passage 77 which has the conductor 46a connected therein. A light coil spring 78 normally maintains the ball 75 on its seat, and when the ball is so seated, any further upward movement of either ball 75 or smaller ball 73 is prevented. A conductor 46b extends from the chamber 70 of the casing 69 to the diaphragm case of the inlet valve V1 for the vessel A.

The provision of the control unit C provides for an opening of the inlet valve V1 for a predetermined time so that a predetermined charge or volume of gas may be introduced into vessel A. After the predetermined volume or charge has been admitted then the control unit C functions to close valve V1 to thereafter permit an expansion of the gas which is in effect trapped within the upper end of the vessel A.

In operation, with the inlet valve V1 presumed to be closed, there is less than inlet pressure in the upper end of the vessel A; however, because of the by-pass line 66 leading to the upper end of the cylinder 63, the full gas stream pressure is acting against the upper end of piston 64 and the piston is in a lowered position within the cylinder 63. In such position the piston rod has moved downwardly and has caused an unseating of the valve 75 whereby communication has been established between line 46b and conductor 46a. Conductor 46a is connected to the conductor 46 extending from the level controller L' and at this time is vented to atmosphere.

As the level in vessel B drops to the predetermined point which causes full pilot pressure to enter conductors 46 and 46a, this full line pressure flows around valve 75 and through conductor 46b to the diaphragm of valve V1 to open this valve. Opening of inlet valve V1 to admit the gas stream into the upper end of vessel A is effected simultaneously with a closing of outlet valve V3 and an opening of outlet valve V4 by means of the piston and valve assembly P. When inlet valve V1 is opened and gas is admitted into the upper end of vessel A, the upper end of vessel A above the liquid level is substantially instantaneously charged to the full gas stream pressure and this pressure is admitted through the connection 67 to the under side of piston 64 of the control unit C to equalize pressures across this piston whereby springs 65 may move the piston and its rod 68 upwardly. As the piston moves upwardly the lower end of the piston rod is lifted and this allows reseating of the valve 75 which shuts off further pressure from conductor 46a, and thereafter the piston rod moves upwardly away from the ball valve 73 to uncover the vent passage 72. When this occurs the pilot pressure within the conductor 46b is vented through passage 72, thereby relieving the application of pressure to the diaphragm of inlet valve V1 and causing said valve to close. Valve 73 remains open until pressures across the piston 64 are again unbalanced. When the inlet valve V1 closes the gas under full stream pressure in the upper end of vessel A is trapped and thereafter expands to displace the liquid from vessel A through conductor 10 and into vessel B. Since outlet valve V4 of the vessel B was opened when the inlet valve V1 for vessel A was opened, the gas in the upper portion of vessel B may escape to the discharge or outlet line 30. The pressure in conductor 46a acting against valve 75 will continue to hold this valve closed and pilot pressure from conductor 46a cannot be applied to inlet valve V1 until the valve 75 is again unseated which will occur only after pressure in the conductor 46a has been vented to atmosphere through conductor 46 by action of the level controller L'.

The inlet valve V2 of the vessel B is controlled in substantially the same manner as inlet valve V1 except that the pilot pressure is conducted to a control unit C' through a conductor 146a which extends from the conductor 46 of the level controller L. The control unit C' is identical in construction to the control unit C and has its chamber 70 communicating with the diaphragm of valve V2 through a line 146b. The upper end of the cylinder 63 of control unit C' is connected to inlet pipe 28 upstream of the valve V2 by a line 166, while the lower end of the cylinder communicates with the interior of the upper end of the vessel through a connection 167. The operation of control unit C' is the same as operation of the control unit C and inlet valve V2 for the vessel B is operated in substantially the same manner as inlet valve V1, that is, valve V2 is initially opened to admit a charge or volume of gas from the main inlet and is then closed to trap the gas under pressure within the upper end of vessel B above the liquid level so that said gas is caused to expand and displace liquid.

The operation of the apparatus is believed obvious from the foregoing. Referring to Figure 1, with the level of the liquid in vessel A at its maximum (23) and the level of the liquid in the vessel B at the minimum (22) the outlet valve V3 of vessel A has been opened with outlet valve V4 of vessel B closed during the preceding cycle. As the level of the liquid in vessel B drops to the level 22, the controller L' operates to place full pilot pressure in conductor 46 whereby the piston and valve assembly P is shifted to the left in Figure 2; this shifting of piston 40 actuates the valves 53 and 54 to close the outlet valve V3 of vessel A and open outlet valve V4 of vessel B. At the same time the pilot pressure from conductor 46 of controller L' is directed through line 46a, then through control unit C and line 46b to the inlet valve V1 of vessel A to thereby open said valve. Opening of the inlet valve V1 introduces a charge or volume of gas under full stream pressure from inlet 26 into the upper end of vessel A above the liquid level. When the charge of gas is within the vessel A the inlet valve V1 is closed through operation of the control unit C.

The charge of gas under full stream pressure within the upper end of the vessel A then expands and in expanding it displaces the liquid from vessel A through conductor 10 and into the vessel B. The rate of displacement is controlled by the adjustment of the choke or regulator 11 in conductor 10. As the gas expands it performs work upon the liquid and the expended energy is released in the form of heat which effects a cooling of the gas and a heating of the liquid. As the gas is cooled, condensation of the liquid components of the gas occurs and the condensate falls downwardly into the liquid body being displaced. This condensate may comprise hydrocarbon components and water which were in the vapor phase under the initial pressure and temperature of the gas stream. The cooling effect may be such that water which is condensed may be frozen to form so-called "hydrates" but these will precipitate downwardly into the warmer body of liquid whereon the frozen particles will be melted or liquefied.

By controlling the volume of gas which is introduced and by controlling the area above the liquid level 23, the ratio of expansion of the gas may be controlled with the result that substantially any desired cooling effect with a resultant controlled temperature drop may be produced. It is evident that gas even at the lower pressures in the order of 750 to 1000 pounds can by expansion be cooled to a much greater extent than if gas under this same pressure was passed through a restriction to produce the cooling by the Joule-Thompson effect. By obtaining the increased temperature drop, increased condensation of the liquid components will be effected so that increased hydrocarbon liquid recovery, as well as dehydration of the gas, will occur. Since there is no gain or loss of heat in the system, the cooling of the gas results in a heating of the liquid body so that freezing difficulties which may be due to hydrates are obviated.

As the liquid in vessel A is displaced into vessel B, the gas above the liquid in vessel B will escape through the open outlet valve V4 to the main outlet line 30 and will continue to do so until the level of the liquid in vessel A drops to the point 22. When this occurs, the level controller L will actuate its pilot control 44 to admit pressure into the conductor 46 which extends to the port 52 of the piston and valve assembly P. This results in a shifting of the piston to the right in Figure 2, which causes a closing of outlet valve V4 and an opening of outlet valve V3. At the same time, pressure is conducted through line 146a, control unit C' and conductor 146b to the inlet valve V2 of the vessel B. A charge or predetermined volume of gas is introduced into vessel B above the liquid level and then by means of control unit C' the inlet valve V2 is closed. The charge of admitted gas then expands within vessel B to displace the liquid back through the conductor 10 into vessel A and in accomplishing such displacement the operation heretofore described is repeated, with the gas being cooled to condense the liquid components thereof; at the same time the liquid is warmed or heated by the energy transfer so as to assure the melting of any hydrates which might form by reason of the extreme cooling of the gas. When the liquid level in vessel B drops to the point 22 the level controller L' again functions to shift the piston to close valve V3, open valve V4 and also open the inlet valve V1, after which the cycle of operation as above described is repeated. It is noted that the body of liquid may change in temperature beyond desired limits, and if so, the liquid may be cooled or heated by use of the heat exchanger 12.

As the liquid components are condensed from the gas stream, these condensates precipitate into the liquid body to increase the volume thereof and as the liquid level rises above the maximum level 23 in the vessel A due to the addition of such condensates, a spillover of liquids through spillover pipe 15 occurs; from this pipe the excess liquids which may be hydrocarbon liquids or water or a mixture of both are conducted to the dump pot 18 and are eventually recovered through the discharge line 21 extending from said dump pot. It is noted that in some instances the initial gas stream entering through line 26 may contain an excessive amount of free water or hydrocarbon liquids and if such be the case, a liquid knockout W may be connected in the inlet line 26 at a point in advance of its connection to the inlet pipes 27 and 28 leading to the vessels A and B. The liquid knockout W will function to remove the free liquids which may be present in the gas stream prior to the passage of the gas stream to the vessels A and B.

From the foregoing it will be evident that the gas stream from which liquid components are to be separated is caused to expand against a liquid body and to perform work thereon, in the course of which cooling of the gas and heating of the liquid results. The particular apparatus which is herein illustrated and described permits carrying out of the method, but the invention is not to be limited to the particular details of the apparatus illustrated. For instance, the pilot control units C and C' are desirable in shutting off the inlet valves upon the introduction of a predetermined charge but the method could be carried out without these control units in which event the controllers L and L' will function to control closing of the inlet valves in accordance with movement of the liquid in the respective chambers; in such instance, the lines 46a and 46b would be connected to each other and the lines 146a and 146b would connect together and the gas inlet valves V1 and V2 which control the gas charge would remain open until the gas had expanded in the particular chamber A or B to drive the liquid level in that chamber downwardly to the level 22, at which time the operation of the level controller, either L or L', would close the respective inlet valve. The particular motor valves, as well as the particular liquid level controllers are subject to variation. So long as the various valves are opened and closed in the desired relationship to permit alternate displacement of the liquid from one vessel to another the main purpose of the invention will be accomplished. The method utilizes the expansion of a gas under pressure to cool the gas and cause condensation of its liquid components whereby recovery of otherwise unrecoverable components is effected; at the same time the liquid body is heated to prevent freezing difficulties which would otherwise occur under the low temperature conditions of operation.

The foregoing disclosure and description of the invention is illustrative and explanatory thereof, and various changes in the size, shape and materials, as well as in the details of the illustrated construction may be made, within the scope of the appended claims, without departing from the spirit of the invention.

Having described the invention, I claim:

1. The method of separating liquids from a gas stream which is under pressure including, confining a liquid body within a chamber, introducing a predetermined charge of gas which consists of a portion of the gas stream into the chamber above the liquid body, then permitting escape of the liquid from the lower portion of the chamber at a restricted rate, whereby the gas above the liquid may expand to displace the liquid from the chamber, the expansion of the gas which causes displacement of the liquid resulting in an energy transfer which cools the gas and heats the liquid body, the cooling of the gas being to the point where liquid components, normally present in the vapor state under initial temperature and pressure of the gas, are condensed and precipitated downwardly into the liquid, halting the displacement of the liquid when it falls to a predetermined level in the chamber, thereafter withdrawing the gas from the upper end of the chamber to permit the liquid to return into said chamber, and controlling the maximum level to which the liquid may rise within the chamber by withdrawing liquid from said chamber whenever the level thereof exceeds the predetermined maximum.

2. The method of separating liquids from a gas under pressure including, confining a liquid body within a pair of chambers having their lower ends in communication whereby said liquid may be displaced from one chamber to the other, controlling the maximum and minimum levels to which the liquid may rise within the chambers, said liquid being at the maximum level in one chamber when at a minimum level in the second chamber, introducing the gas under pressure from which liquids are to be separated into the first chamber having the liquid at its maximum level and into the area above said liquid, regulating the escape of liquid from said first chamber into the second chamber, whereby the gas above the liquid may expand to displace the liquid into the said second chamber, expansion of the gas resulting in a reduction of temperature of the gas to the point that hydrocarbon condensate and water, normally present in the vapor state under the initial pressure and temperature of the gas, are condensed and precipitate downwardly into the liquid, withdrawing gas from the area of the second chamber above the liquid level during the displacement of the liquid from said first chamber into the second chamber, halting further displacement of the liquid from the first chamber when the level thereof falls to the predetermined minimum, thereafter withdrawing gas from the first chamber to permit the liquid to re-enter said chamber to its maximum level, and controlling the maximum liquid levels in the chambers by withdrawing a portion of the liquid when said liquid exceeds said maximum level.

3. The method as set forth in claim 2, wherein the withdrawal of liquid is effected by withdrawing that liquid from said first chamber which exceeds the maximum predetermined level.

4. The method of separating liquids from a gas under pressure including, confining a liquid body within a pair of chambers having their lower ends in communication whereby said liquid may be displaced from one chamber to the other, controlling the maximum and minimum levels to which the liquid may rise within the chambers, said liquid being at the maximum level in one chamber when at a minimum level in the second chamber, introducing the gas under pressure from which liquids are to be separated into the first chamber having the liquid at its maximum level and into the area above said liquid, regulating the escape of liquid from said first chamber into the second chamber, whereby the gas above the liquid may expand to displace the liquid into the said second chamber, expansion of the gas resulting in a reduction of temperature of the gas to the point that hydrocarbon condensate and water, normally present in the vapor state under the initial pressure and temperature of the gas, are condensed and precipitate downwardly into the liquid, withdrawing gas from the area of the second chamber above the liquid level during the displacement of the liquid, halting further displacement of the liquid from the first chamber when the level thereof falls to the predetermined minimum, thereafter introducing the gas under its initial pressure and temperature into the second chamber above the liquid level therein, withdrawing gas from the first chamber to permit the gas in the second chamber to expand and displace the liquid back into the first chamber, such expansion effecting condensation and precipitation of liquid components from the gas into the liquid, halting the displacement of the liquid from the second chamber when said liquid falls to the predetermined minimum level, and controlling the maximum liquid levels in the chambers by withdrawing a portion of the liquid when said liquid exceeds said maximum level.

5. The method as set forth in claim 4, together with the additional steps of alternately introducing and withdrawing the gas from the two chambers to effect continuous operation.

6. An apparatus for separating liquids from a gas stream flowing under pressure, which stream contains hydrocarbon condensate and water in the vapor state, said apparatus including, a chamber having a liquid body confined therein, a conductor extending into the upper portion of the chamber, means for introducing the gas stream through said conductor into the chamber above the liquid therein, a conductor extending from the lower end of the chamber and having means for regulating the flow therethrough, whereby the introduced gas under pressure may expand to displace the liquid from the chamber at a regulated rate, the expansion of the gas resulting in a reduction of the temperature of the gas to the point where hydrocarbon condensate and water, normally present in the vapor state under the initial pressure and temperature of the gas stream, are condensed and precipitate downwardly into the liquid being displaced, a liquid level controller assembly mounted in the lower portion of the chamber and responsive to liquid level for shutting off the escape of liquid from the chamber when the level of such liquid falls to a predetermined point, a gas discharge line extending from the upper end of the chamber for thereafter withdrawing the gas from the chamber, means for effecting a return of the liquid back into the chamber as gas is withdrawn therefrom, and means for withdrawing a portion of the liquid from the chamber.

7. An apparatus as set forth in claim 6, wherein the means for withdrawing liquids comprises means associated with the chamber for controlling the maximum level to which the liquid may rise within said chamber, and means for withdrawing from the chamber any liquid above said maximum level.

8. An apparatus for separating liquids from a gas stream flowing under pressure, which stream contains hydrocarbon condensate and water in the vapor state, said apparatus including, a chamber having a liquid body confined therein, gas inlet conductor communicating with the upper portion of the chamber, means for introducing the gas stream through said conductor into the chamber above the liquid therein, a liquid conductor extending from the lower end of the chamber and having means for regulating the flow therethrough, whereby the introduced gas under pressure may expand to displace the liquid from the chamber at a regulated rate, the expansion of the gas which causes displacement of the liquid resulting in an energy transfer which cools the gas and heats the liquid, the cooling of the gas being to a point where liquid components, normally present in the vapor state under initial temperature and pressure of the gas stream, are condensed and precipitate downwardly into the liquid, a liquid level controller within the lower portion of the chamber and responsive to the liquid level therein for shutting off further displacement of the liquid from the chamber when said liquid reaches a predetermined minimum level within the chamber, a gas discharge line extending from the upper end of the chamber for withdrawing gas from said chamber, a gas outlet valve in said discharge line, a gas inlet valve mounted in the gas inlet conductor, means for closing the gas outlet valve when the gas inlet valve is open and for closing the gas inlet valve when the gas outlet valve is open, and means for controlling the maximum level to which the liquid may rise within the chamber by withdrawing a portion of said liquid when the same exceeds a predetermined level.

9. An apparatus as set forth in claim 8, together with means for effecting a return of liquid into the chamber when gas is withdrawn from the chamber through the discharge line, and means for controlling the maximum level to which the liquid may rise within said chamber.

10. An apparatus as set forth in claim 8, together with means for effecting a return of liquid into the chamber when gas is withdrawn from the chamber through the discharge line, means for controlling the maximum level to which the liquid may rise within said chamber, and additional means for withdrawing the liquid which is in excess of the maximum level from the chamber.

11. An apparatus for separating liquids from a gas stream under pressure, wherein the gas stream has hydrocarbon liquids and water, normally present in the vapor state therein under the initial pressure and temperature of the stream, said apparatus including, a first chamber, a second chamber, a conductor establishing communication between the lower ends of the chambers and having a regulating means therein for regulating the flow therethrough, said chambers having a liquid confined therein which may be displaced from one chamber to the other through said conductor, a gas inlet conductor extending into the upper portion of the first chamber, a gas outlet conductor extending from said first chamber, a gas inlet conductor extending into the second chamber, a gas outlet extending from said second chamber, a gas inlet valve mounted in each of the inlet conductors, a gas outlet valve mounted in each of the outlet conductors, and means for actuating the inlet and outlet valves in relationship to each other whereby the gas inlet valve for the first chamber and the gas outlet valve for the second chamber is open when the gas outlet valve for the first chamber and the gas inlet valve for the second chamber is closed, the gas stream being admitted into the upper end of the first chamber and expanding therein to displace the liquid body from the first chamber into the second chamber to effect a cooling of the gas and a heating of the liquid, liquid level control means in the first chamber responsive to the liquid level for closing the gas outlet valve for the second chamber and for opening the gas outlet valve for the first chamber when the liquid level within the first chamber drops to a predetermined point, and means for maintaining a maximum level to which the liquid may rise in the chambers by withdrawing a portion of said liquid when said liquid exceeds a predetermined level.

12. An apparatus as set forth in claim 11, together with means also actuated by the liquid level controller in the first chamber for also closing the inlet valve to the first chamber and opening the inlet valve to the second chamber, whereby gas under pressure is directed to the second chamber and may expand therein to displace the liquid from the second chamber back into the first chamber, and a liquid level control means in the second chamber responsive to the liquid level therein for actuating the inlet and outlet valves to close the inlet to the second chamber and at the same time close the discharge from the first chamber, said liquid level control means simultaneously opening the inlet to the first chamber and also opening the outlet from the second chamber, said last-named liquid level controller operating when the liquid in the second chamber falls to a predetermined point.

13. An apparatus for separating liquids from a gas stream under pressure, wherein the gas stream has hydrocarbon liquids and water, normally present in the vapor state, therein under the initial pressure and temperature of the stream, said apparatus including, a first chamber, a second chamber, a conductor establishing communication between the lower ends of the chambers and having a regulating means therein for regulating the flow therethrough, said chambers having a liquid confined therein which may be displaced from one chamber to the other through said conductor, a gas inlet conductor extending into the upper portion of the first chamber, a gas outlet conductor extending from said first chamber, a gas inlet conductor extending into the second chamber, a gas outlet extending from said second chamber, a gas inlet valve mounted in each of the inlet conductors, a gas outlet valve mounted in each of the outlet conductors, means for actuating the inlet and outlet valves in relationship to each other whereby the gas is alternately introduced into and expanded within one chamber while being discharged from the other chamber, the introduction of gas into each chamber being into the area above the liquid confined therein at the time the liquid in that chamber is at maximum level, whereby the gas in expanding displaces the liquid body from one chamber into the other to effect a cooling of the gas and a heating of the liquid, the cooling of the gas producing a condensation of the hydrocarbon liquids and water which are normally present in the vapor state under the initial pressure and temperature of the gas, and means for maintaining the maximum level to which the liquid may rise by withdrawing a portion of the liquid when said liquid exceeds said predetermined maximum level.

14. An apparatus as set forth in claim 13, together with a liquid level controller in each chamber for controlling the minimum level of the liquid within said chamber, and means actuated by each liquid level controller and connected with the inlet and outlet valves for actuating said valves in desired sequence.

15. An apparatus as set forth in claim 13, together with means for shutting off introduction of the gas stream into each chamber above the liquid level therein when the pressure of the gas in the chamber equals the pressure in the gas inlet conductor connected with said chamber.

16. An apparatus as set forth in claim 13, together with means for maintaining the gas outlet valve of the second chamber open during the displacement of liquid from the first chamber to the second chamber, and means for maintaining the gas outlet valve of the first chamber open during displacement of liquid from the second chamber back into the first chamber.

References Cited in the file of this patent

UNITED STATES PATENTS

| | | |
|---|---|---|
| 2,133,774 | Vaughan | Oct. 18, 1938 |
| 2,151,248 | Vaughan | Mar. 21, 1939 |
| 2,364,660 | Reid | Dec. 12, 1944 |
| 2,477,367 | Garrison | July 26, 1949 |
| 2,528,028 | Barry | Oct. 31, 1950 |
| 2,671,322 | Barry | Mar. 9, 1954 |
| 2,675,884 | Deanesly | Apr. 20, 1954 |